ELECTRICAL DIVIDER ARRANGEMENT FOR RECEIVING ANALOG A-C INPUTS AND YIELDING AN OUTPUT CORRESPONDING TO THE QUOTIENT

Filed May 11, 1964 3 Sheets-Sheet 1

MARVIN MASEL
INVENTOR

BY S. A. Giarratana
George B. Oujevolk
ATTORNEYS

Jan. 16, 1968 M. MASEL 3,364,341

ELECTRICAL DIVIDER ARRANGEMENT FOR RECEIVING ANALOG A-C INPUTS AND YIELDING AN OUTPUT CORRESPONDING TO THE QUOTIENT

Filed May 11, 1964 3 Sheets-Sheet 2

MARVIN MASEL
INVENTOR.

BY S. A. Giarratana
George B. Oujevolk
ATTORNEYS

ELECTRICAL DIVIDER ARRANGEMENT FOR RECEIVING ANALOG
A-C INPUTS AND YIELDING AN OUTPUT
CORRESPONDING TO THE QUOTIENT
Filed May 11, 1964 3 Sheets-Sheet 3

MARVIN MASEL
INVENTOR.
BY S. A. Giamatana
George B. Oujevolk
ATTORNEYS 3,364,341

ELECTRICAL DIVIDER ARRANGEMENT FOR RECEIVING ANALOG A-C INPUTS AND YIELDING AN OUTPUT CORRESPONDING TO THE QUOTIENT

Marvin Masel, West Englewood, N.J., assignor to General Precision Inc., Little Falls, N.J., a corporation of Delaware Filed May 11, 1964, Ser. No. 366,560
5 Claims. (Cl. 235—196)

ABSTRACT OF THE DISCLOSURE

A first signal in analog form is fed to first and second AND gates. The outputs of the first and second AND gates are fed to a D-C operational integrator in the one and the other phase at a junction. Level detection means are responsive to the output of the integrator and the level detection means again supply an output to third and fourth pulsed AND gates which in turn act on a flip-flop. The second signal is likewise fed to fifth and sixth AND gates while gating means from the flip-flop act as the second input to the fifth and sixth AND gates. The output of the fifth and sixth AND gates is fed to the integrator junction to maintain the output thereof at substantially zero. The digital count of the flip-flop is fed to a stepper motor acting on a counter to provide a digital pulse read-out. A squaring circuit forms the second input to the first, second, fifth and sixth AND gates and the gating means.

The present invention relates to digital integrators and more particularly to an electronic integrator which can convert A-C amplitude modulated inputs into integrated digital outputs.

At the present time, conventional mechanical integrators such as the ball and disc integrator or motor-tachometer are not sufficiently accurate or are too large and heavy for many applications. The present invention relates to an electronic integrator useful in aircraft and space navigation, especially in a Doppler navigator computer. Heretofore, it has been customary to convert an analog input into digital form by a code wheel. In my copending patent application, Ser. No. 262,578, filed Mar. 4, 1963, now abandoned, it has been shown that a code wheel is not essential, and use is made instead of a potentiometer, comparator, shift register and ladder network arrangement. In that application, there is the necessity of a servo loop to rotate the potentiometer. In the present invention, a solid state type of device is used with no moving parts. Furthermore, a ratio arrangement is provided so that the system can be constructed to be generally stable in the face of varying amplitude, frequency, and harmonic content of the A-C input.

Accordingly, an object of the present invention is to provide a digital integrator with no moving parts.

Yet another object of the present invention is to provide a digital integrator which can accept an A-C analog input and supply output pulses to a counter.

The invention also contemplates providing a digital integrator which can integrate the quotient of two variables available as A-C voltages.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Figure 1:
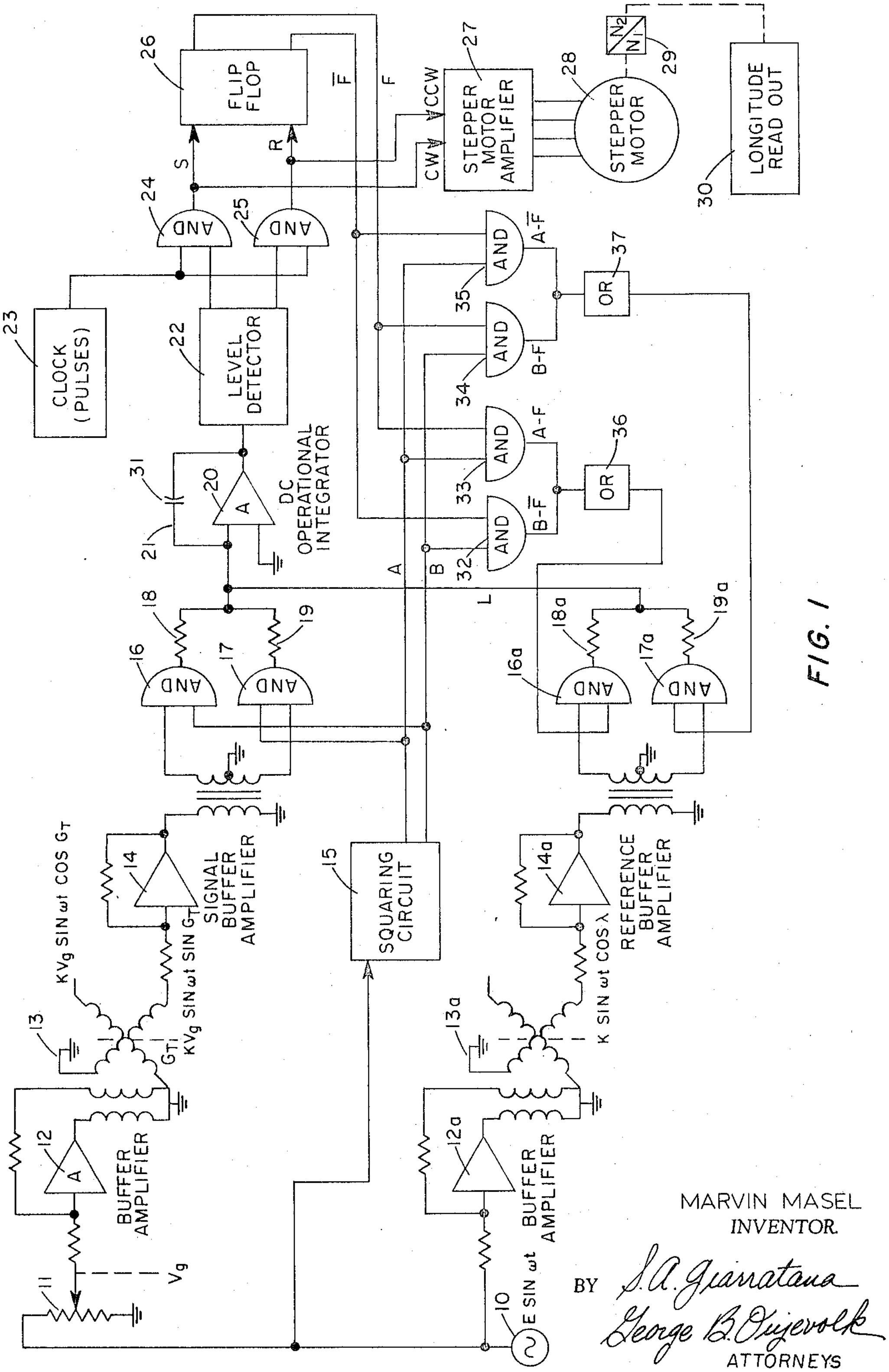
Figure 2A:
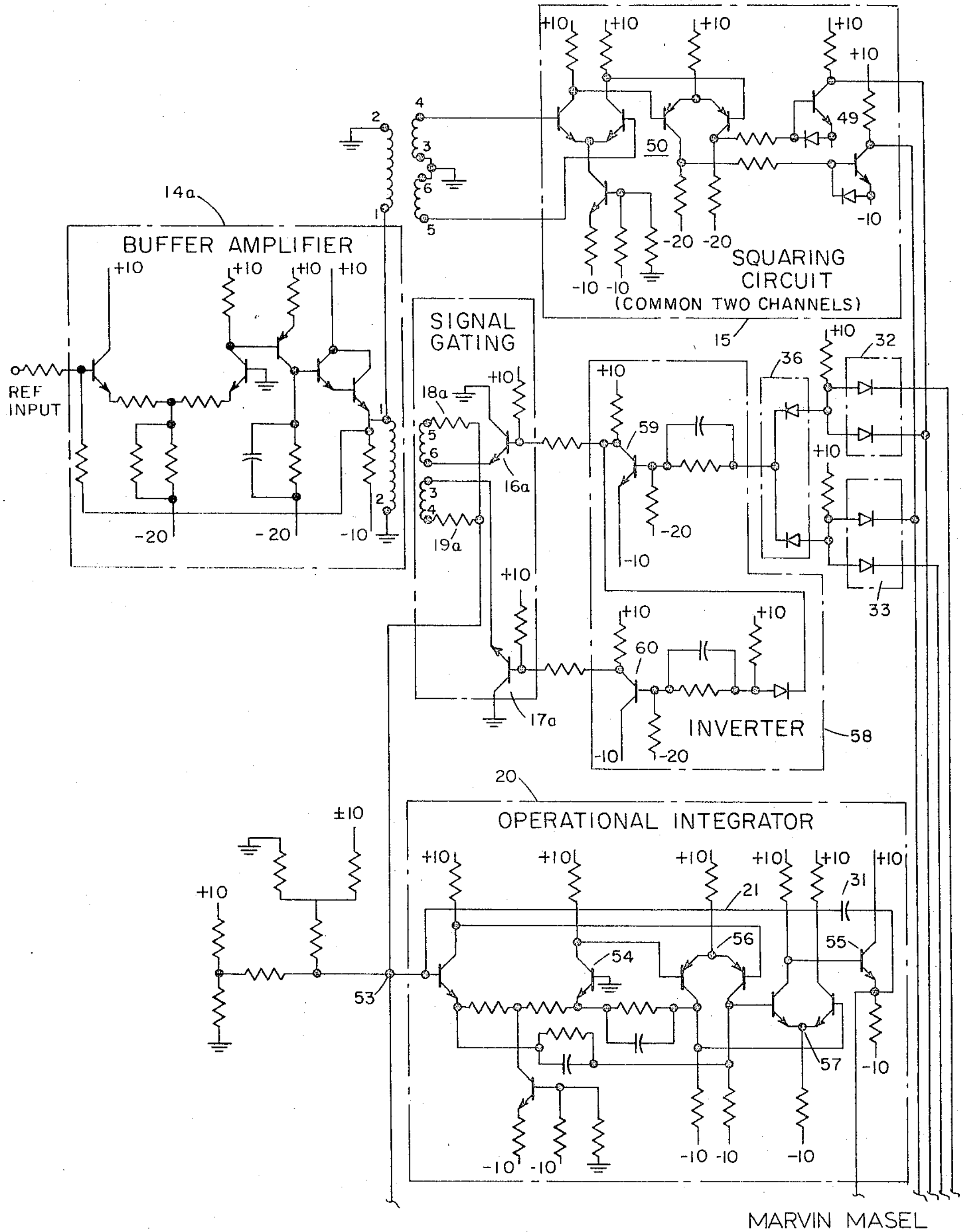
Figure 2B:
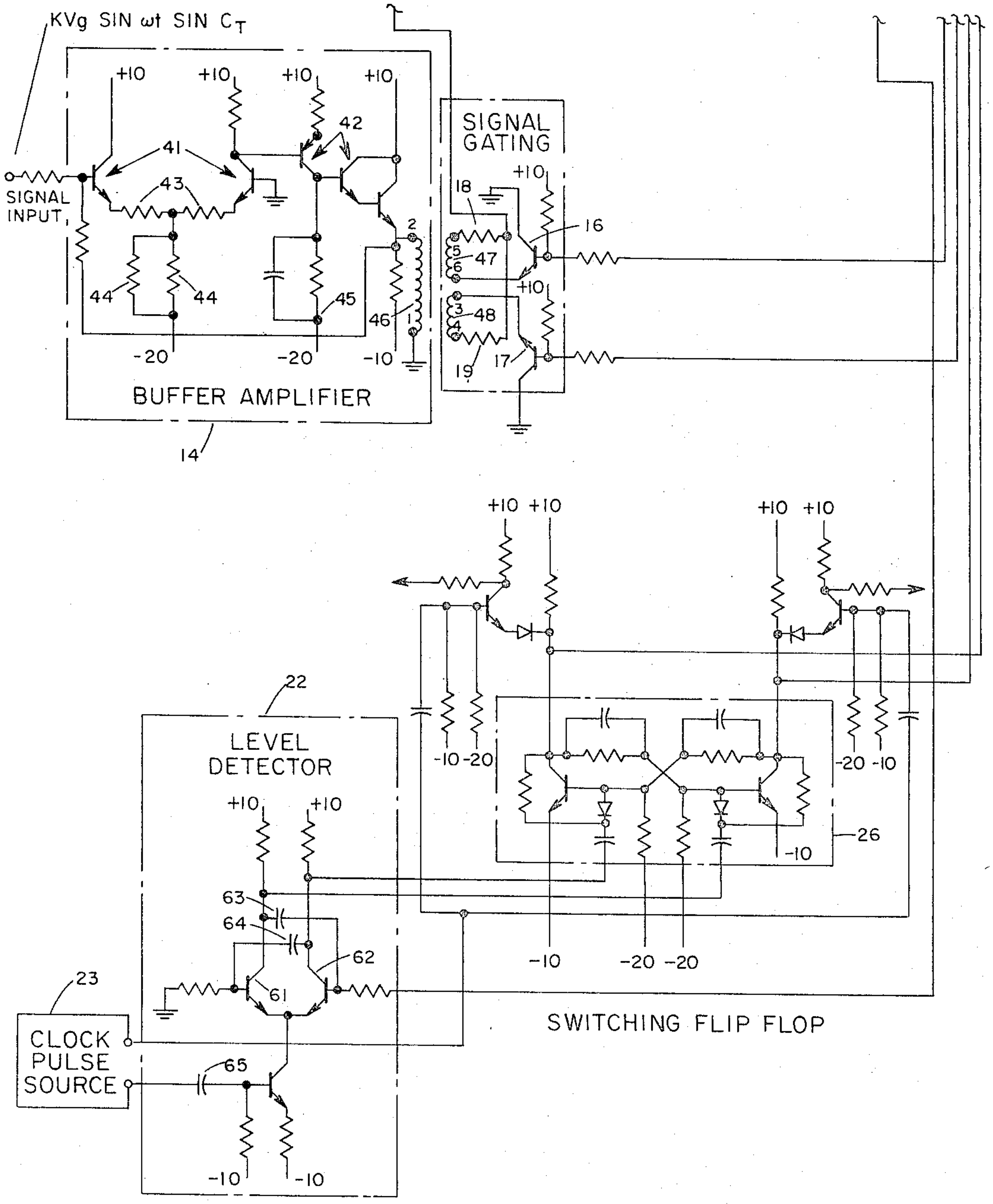

Other objects and advantages will become apparent from the following description taken in conjunction with the accompanying drawing in which:

FIG. 1 is a block diagram of the components of the invention and their operation as a system, and FIGS. 2*a* and 2*b* are schematic electrical circuit diagrams of the block diagram shown in FIG. 1.

Before describing the construction of the invention, it is advantageous to first visualize what is to be accomplished and how it is accomplished. An analogy is useful in understanding the invention. Suppose it is desired to integrate (i.e., totalize) flow through a spigot into a barrel. One method of accomplishing this is to keep the water level in the barrel at a certain mark. This is achieved by adding or removing a ladleful of water once per second so as to keep the water in the barrel at its starting level. The difference between the number of ladlefuls removed and the ladlefuls added times the capacity of the ladle represents the integrated flow rate. The analogy may be carried further by allowing a spigot to remove water out of the barrel as well as to put water in and by varying the capacity of the ladle with time.

In the present invention, the principle value in having an integrator capable of accepting amplitude modulated A-C inputs is that an electromechanical resolver which is an accurate and economical method of resolving a vector into components can only operate with A-C excitation. Thus, in aircraft navigation, when computing present position of a vehicle, it is necessary to integrate vector components, i.e., the North-South and the East-West components of groundspeed. Groundspeed, $V_g$ is resolved about the ground track angle $G_T$ (angle between the aircraft velocity vector and true North) to provide North-South and East-West components of velocity. To obtain longitude present position, it is necessary to integrate the quotient of East-West velocity divided by the cosine of the latitude angle. The East-West velocity voltage is $K_1 V_g \sin wt. \cos G_T$ where $K_1$ is some constant voltage factor, $V_g$ is the ground speed, $\sin wt$ is the A-C voltage factor, and $G_T$ is the ground track angle. The cosine of latitude voltage is $K_2 \sin wt \cos L$ where $K_2$ is the constant voltage factor in the latitude channel similar to $K_1$ in the longitudinal channel and L is the latitude angle.

The present invention provides for an electrical divider arrangement for receiving analog A-C inputs and yielding a pulse output corresponding to the quotient. A first A-C signal value of the one or the other phase which is to be integrated with a second signal value is fed to the input side of first buffer amplifier means. The output side of said first buffer amplifier means is connected to a first transformer. Responsive to said first transformer are first and second AND gates, each of said AND gates responding only to the one or the other phase. Also coupled to said AND gates is a squaring circuit forming the second input to each AND gate so that the output from the AND gates is a direct current in the one or the other direction. The output of said first and second AND gates are in turn fed to the input junction of a D-C operational integrator which has polarity inversion means therein, as well as a feedback loop with a capacitor for integration. Level detection means are responsive to the output of said integrator. The level detection means include a high side and a low side. The output from the level detection means is to third and fourth AND gates which are also fed by a clock pulse source, one AND gate being responsive to the high side and the other to the low side. The pulse outputs from these AND gates in turn act on a flip-flop with a SET and RESET inputs, the third and fourth AND gates each acting on a respective one of said SET and RESET inputs. The second A-C signal value is fed to a second buffer amplifier means similar to said first buffer amplifier means, the output of which is likewise fed to a second transformer. Responsive to said transformer are fifth and sixth AND gates each responding only to the one or the other phase, the output again being D-C current in the one or the other direction. The other input to the fifth and sixth AND gates is supplied by gating means between the flip-flop, the fifth and sixth AND gates, and also fed by the squaring circuit. The gating circuit is so disposed that an output in one direction from the integrator will result in an output in the same direction to the input junction of the integrator. Since the integrator inverts its input, the output from the integrator is maintained substantially at zero. The digital count of the flip-flop in the one or the other direction is fed to utilization means such as a stepper motor acting on a counter to provide a digital readout of the number of pulses in the one or the other direction.

Referring to the block diagram, the polarity of the rectified East-West velocity signal voltage is dependent on the phase of the signal A-C input. The reference voltage from the latitude channel is also rectified, but with polarity determined by a logic circuit. The rectified signal voltage is integrated by means of an operational integrator with capacitive feedback representing the spigot and barrel in the analogy. Once every clock-time, a flip-flop is set or reset depending upon the instantaneous polarity of the D-C operational amplifier output. The flip-flop state determines whether the rectified reference voltage will be added to or subtracted from the D-C operational integrator input. Thus, a fixed amount of electric charge is added to or subtracted from the "barrel" by the reference channel during each clock interval just as with the ladle of the analogy. The net total amount of "ladlefuls" is tabulated by a stepper motor driving a counter. To obtain latitude change from North-South velocity, it is sufficient to use a fixed reference voltage. To compute longitude from East-West velocity is more difficult because the meridians converge towards the poles. In the drawing, only the longitude channel is shown.

The aircraft supply voltage source 10 having an output voltage of E sin *wt* is attenuated by a potentiometer 11 in accordance with groundspeed $V_g$. This voltage value corresponding to $V_g$ is then fed to a buffer amplifier 12 to excite a resolver 13 positioned to ground track angle $G_T$. The resolver has two outputs namely $K_1$ $V_g$ sin *wt* cos $G_T$ to be integrated for the latitude computation and $K_1$ $V_g$ sin *wt* sin $G_T$ used in the longitude computation as an input to the buffer amplifier 14. At the same time, the supply voltage E sin *wt* is fed to a squaring circuit 15. The squaring circuit will convert the A-C sinusoidal supply voltage to a square wave to act as a reference for full wave, phase sensitive rectification. The output from the squaring circuit and the output from the buffer amplifier 14 are fed to two AND gates 16 and 17, each designed to act on successive half cycles. The outputs from the AND gates are each fed to one of the input resistors 18 and 19 of a D-C operational integrator 20 with capacitive feedback 21. Current flow through each resistor is a one-half sine wave for each alternate one-half cycle. The direction of current flow is reversed by reversing the phase of the signal corresponding to $K_1$ $V_g$ cos $G_T$. Also fed into the D-C operational integrator 20 is the rectified reference $K_2$ sin *wt* cos L derived from the latitude channel. The A-C input from source 10 having a value E sin *wt* is fed to a buffer amplifier 12*a*. The output in turn is fed to a resolver 13*a* positioned at the latitude angle L by the input from the latitude channel. The output from the resolver is therefore $K_2$ sin *wt* cos L. This value goes to a second buffer amplifier 14*a* and from there the signal goes to AND gates 16*a* and 17*a*. To operate the AND gates another input is required from the squaring circuit. AND gates 16*a* and 17*a* gate half cycles of sinusoidal voltage to input resistors 18*a* and 19*a* of the D-C operational integrator 20.

The output of the D.C. operational integrator 20 goes to a level detector 22. The level detector is effectively a switch, one of whose outputs is high and the other low, depending upon the polarity of the voltage output of the operational integrator 20. Clock pulses 23 will be directed to either the "SET" or "RESET" inputs of the flip-flop 26 by AND gates 24 or 25 depending upon the state of level detector 22. These pulses will also appear at the C.W. or C.C.W. inputs of stepper motor amplifier 27 which drives stepper motor 28 which in turn drives a longitude readout counter through gear train 29.

The outputs of flip-flop 26 are combined with the outputs of the squaring circuit 15 by AND gates 32, 33, 34, and 35 and OR gates 36 and 37 to enable AND gates 16*a* and 17*a*. AND gates 16*a* and 17*a* serve to rectify the output of buffer 14*a* with a polarity dependent upon the state of flip-flop 26. Half wave current pulses will pass through resistors 18*a* and 19*a* to the summing junction of operational integrator 21.

Polarities are chosen such that a positive output of operational integrator 20 will result in positive currents through resistors 18*a* and 19*a*. Since the operational integrator 20 performs a sign inversion, the result is to maintain the output of operational integrator 20 at close to ground potential.

Although the foregoing explanation and the block diagram of FIG. 1 are sufficient for a general understanding of the invention, the actual construction and the components is better shown in the schematic drawing. For convenience of sequential explanation, the longitude channel, starting with the value $K_1V_g$ sin *wt* sin $G_T$ was placed at the top of the block diagram. But, for convenience of electrical illustration the location of the channels is reversed on the schematic diagram. In FIG. 2, the signal $$K_1V_g \sin wt \sin G_T$$

is shown fed to buffer amplifier 14. The particular construction of this buffer amplifier 14 in practice, and as shown in the drawing, includes a push-pull stage 41 e.g., two NPN transistors and a follower stage 42 shown as one PNP and two NPN transistors. The transistors of the push-pull stage having their emitters coupled across a junction of two resistors 43, while in the follower stage the base of the PNP transistor is connected to the collector of one of the NPN transistors of the push-pull stage while the two NPN transistors of the follower stage are cascaded and connected to the collector of the follower stage of the PNP transistor. The output from the buffer amplifier is across transformer primary 46 to two transformer secondaries 47, 48 connected to the transistor AND gates 16 and 17 shown in the schematic drawing as NPN transistors, the inputs from the squaring circuit going to the transistor bases, the signal being gated across input resistors 18 and 19 of the operational integrator 20 having a feedback line 21 containing capacitor 31. The squaring circuit 15 is fed by the buffer amplifier 14*a* of the constant input which also serves as the reference input. The squaring circuit which is common to both channels has a driver section 49 with two cascaded NPN transistors and a squaring section 50 having a pair of emitter coupled NPN transistors and a pair of emitter coupled PNP transistors. The output is from each transistor collector of the driver section, one output being termed "A," the other "B."

The D-C operational integrator 20 receives an input both from the constant reference channel through buffer amplifier 14*a* and also from the longitude signal channel where the input is to amplifier 14. The input to the operational integrator 20 is to a junction point 53. The operational integrator has input and output sections with input NPN transistor 54, output NPN transistor 55, a PNP emitter coupled stage 56, and an NPN emitter coupled stage 57. Integration is performed by capacitor 31.

With regard to AND gates 24 and 25, level detector 22, clock pulse source 23 and logic arrangement 32, 33, 34, 35, 36, 37, certain practical differences exist between the theoretical explanation of the block diagram and the carrying out of this conception into practice as shown in the schematic circuit. In the schematic arrangement, only one set of diode AND gates 32, 33 with OR gate 36 are shown. The second set which appears in the block diagram and not in the schematic drawing act as the reverse of the first set. Therefore, an INVERTER circuit 58 is provided between AND gates 16a, and 17a which includes a first NPN trigger transistor 59 with RC coupling therefore between OR gate 36 and AND gate 16a and a second NPN trigger transistor 60 and RC coupling between the collector of trigger transistor 59 and AND gate 17a.

The level detector is interposed between the clock pulse source 23 and the Eccles-Jordan flip-flop. It receives its input from the D-C operational integrator. Level detector 22 has two emitter coupled NPN transistors 61, 62, each transistor has its collector coupled to the base of the other transistor across a capacitor 63, 64. The emitter junction is connected to the collector of a third NPN transistor whose base is connected to the pulse source 23 across a third capacitor 65. The signal polarity from the D-C operational integrator 20 will cause one or the other of the paired transistors 61 or 62 to turn on momentarily upon a positive transition of the clock input number ONE to capacitor 65. The Eccles-Jordan flip-flop will be set or reset depending upon whether transistors 61 or 62 has conducted. The Eccles-Jordan flip-flop 26 is conventional as described in Army Technical Manual TM 11–690 "Basic Theory and Application of Transistors," March 1959, page 203. However, positive transitions on clock input number TWO (which are out of phase with transitions on clock input number ONE) interrogate flip-flop 26 and cause a pulse to be directed to either the clockwise or counter-clockwise input of a stepper motor amplifier 27 which control the turning of stepper motor 28.

The AND gate connections are as follows: AND gate 32 is fed by lines B and $\overline{F}$; AND gate 33 is fed by lines A and F; AND gate 34 is fed by lines B and F; while AND gate 35 is fed by lines A and $\overline{F}$. Additionally, AND gates 32 and 33 are linked to OR gate 36; AND gates 34 and 35 are linked to OR gate 37; OR gate 36 goes to gate 16a of the latitude channel signal while OR gate 37 goes to gate 17a of the latitude channel signal.

The drawings show the longitudinal channel. In this channel the reference voltage varies with the latitude since the output of buffer amplifier 12a is fed to a resolver 13a positioned at the latitude angle by the input from the latitude channel. In the latitude channel, the circuitry is the same as in the longitude channel, except that the reference is fixed since there is no convergence towards the poles.

The arrangement of the present invention can be adapted to direct utilization of pulses derived from a Doppler radar or from a pickup on the fifth wheel of a land vehicle. In this case, the carrier voltage is applied directly to the $G_T$ resolver, eliminating the $V_g$ voltage divider. The output flip-flop will then provide the direction control for a reversible counter which counts the Doppler or fifth wheel pulses.

Another application of the invention is in an inertial navigation system. It is necessary to torque gyros at rates proportional to $(\dot{\phi}+E_r)\sin\lambda$ or $(\dot{\phi}+E_r)\cos\lambda$, ($\phi$=longitude, $E_r$=earth's rate). In this case, the invention is not used as a Motor-Tachometer Replacement at all. The outputs of a latitude resolver are converted into direction control gates for a reversible counter, as above. The counter counts pulses from a longitude integrator and from a stable oscillator representing earth's rate.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. In an electrical divider arrangement for receiving analog A-C inputs and yielding a pulse output with spacings corresponding to the quotient of said inputs, comprising, in combination:

first input means including an input side thereto to receive a first signal value of the one or the other phase to be integrated with a second signal value;

first and second AND gates responsive to said first input means as one input thereto, each of said AND gates respectively responding only to the one or the other phase;

a squaring circuit also coupled to said AND gates forming the second input thereto so that the output of said AND gates is a direct current in the one or the other direction;

a D-C operational integrator including polarity inversion means therein and an input junction acted on by said first and second AND gates;

level detection means responsive to the output of said integrator including a high side and a low side;

third and fourth AND gates fed by said level detection means, the high side operating the one and the low side the other of said third and fourth AND gates;

a clock pulse source feeding said third and fourth AND gates;

a flip-flop with SET and RESET inputs, said third and fourth AND gates each feeding a pulse output to a respective one of said SET and RESET inputs;

second input means similar to said first input means including an input side thereto to receive a second signal value to be integrated with said first signal value;

fifth and sixth AND gates having said second input means as one input thereto, each AND gate responding only to the one or the other phase; the output of each AND gate leading to said integrator input junction to supply direct current thereto in the one or the other direction;

gating means from the flip-flop to provide the second input to the fifth and sixth AND gates also receiving an input from said squaring circuit being disposed so that an output in the one direction from the integrator will result in an output in the same direction from the fifth and sixth AND gates to the input junction of the integrator maintaining the output from the integrator at substantially zero; and, utilization means coupled to said flip-flop, responsive to pulses in the one or the other direction, the number of said pulses being a digital count of said integrated value.

2. An arrangement claimed in claim 1, said first and second input means being buffer amplifiers.

3. An arrangement claimed in claim 2 including first and second transformers fed by said first and second buffer amplifiers output, said first and second AND gates being responsive to said first transformer, said fifth and sixth AND gates being responsive to said second transformer.

4. An arrangement as claimed in claim 3, said utilization means including a stepper motor and counter responsive to the stepper motor.

5. An arrangement as claimed in claim 3, said gating means including inversion means with regard to the fifth and sixth AND gates so that the input to one AND gate is inverted with respect to the other AND gate.

References Cited

UNITED STATES PATENTS

| | | | |
|---|---|---|---|
| 2,744,683 | 5/1956 | Gray | 235—150.271 |
| 2,839,244 | 6/1958 | McCoy et al. | 235—195 |
| 2,966,307 | 12/1960 | Schmid | 235—196 |

MALCOLM A. MORRISON, *Primary Examiner.*